United States Patent
Franzi

[11] 3,904,252
[45] Sept. 9, 1975

[54] VEHICLE HYDRAULIC BRAKE SYSTEMS

[75] Inventor: Ricardo Franzi, Turin, Italy

[73] Assignee: Fiat Societa per Azioni, Turin, Italy

[22] Filed: June 28, 1974

[21] Appl. No.: 484,034

[30] Foreign Application Priority Data
Nov. 30, 1973 Italy................................ 70511/73

[52] U.S. Cl. ............................. 303/22 R; 303/22 R
[51] Int. Cl.² ............................................. B60T 8/22
[58] Field of Search .......... 303/6 C, 6 R, 22 R, 22 A

[56] References Cited
UNITED STATES PATENTS
3,762,776  10/1973  Kawabe et al. ................... 303/22 R
3,840,280  10/1974  Watanabe ........................ 303/22 R

*Primary Examiner*—Duane A. Reger
*Attorney, Agent, or Firm*—Sughrue, Rothwell, Mion, Zinn & Macpeak

[57] ABSTRACT

This invention relates to a pressure reduction valve for a vehicle hydraulic brake system, said valve having an intake port connected to the pressure source and a delivery port connected to the rear brakes of the vehicle, first valve means located between the intake port and the delivery port for reducing the hydraulic pressure between the above ports, an elastic means connected to the chassis of the vehicle for actuating the above first valve means, said elastic means being able to assume intermediate positions between a first and a second limit position corresponding respectively to the case of the vehicle being unloaded and to the case of the said elastic means being broken, second valve means being included capable of connecting directly the intake and delivery ports, said second valve means being actuated by the said elastic means when it assumes the above cited second limit position.

3 Claims, 4 Drawing Figures

FIG. 3

VEHICLE HYDRAULIC BRAKE SYSTEMS

The present invention refers to improvements made in vehicle hydraulic brake systems. It is already known to use a valve unit for the reduction of pressure to the rear wheel brakes of a vehicle when the vehicle is equipped with a single hydraulic brake system or with two separate circuits, respectively for the front wheels and for the rear wheels; such valve unit is commonly called a "pressure reducer" or "braking corrector" and its operation depends upon the load of the vehicle and it is normally actuated by a small torsion bar connected to the axle of the vehicle, or generically by any kind of elastic means.

The invention refers in particular to a pressure reducer of the type described in the Italian PAT. No. 841,315 of the applicant; however the use of the inventive concept can be easily extended to any other reduction valve, provided it is actuated by an elastic means connected to the axle of the vehicle.

A drawback present in many pressure reduction valves actuated by an elastic means, consists in the fact that, in the event the elastic means breaks, the valve is switched over to a position in which it effects the maximum of pressure reduction in any braking condition. The necessity consequently arises of being able to shut out the "braking corrector" from the rear brake circuit in the event elastic means breaks: the object of the present invention, in fact, is to realize improvement on such a type of valve, to eliminate the above mentioned drawback.

The invention achieves this object by means of a pressure reduction valve for a vehicle hydraulic brake system, said valve having an intake port connected to the pressure source and a delivery port connected to the rear brakes of the vehicle, first valve means located between the intake port and the delivery port for reducing the hydraulic pressure between the above ports, an elastic means connected to the chassis of the vehicle for actuating the above first valve means, said elastic means being able to assume intermediate positions between a first and a second limit position corresponding respectively to the case of the vehicle being unloaded and to the case of the said elastic means being broken, characterized by the fact that second valve means are included capable of connecting directly the intake and delivery ports, said second valve means being actuated by the said elastic means when it assumes the above cited second limit position.

Other characteristics of the valve according to the invention will be rendered more clear by the following detailed description which concerns some embodiments of the valve itself, supplied merely by way of non limiting examples; the description referring to the enclosed figures, in which:

FIGS. 1 and 3 show longitudinal sections of the valve according to two forms of realization;

In all the figures the the corresponding elements are indicated with the same reference numerals.

Figure 1:
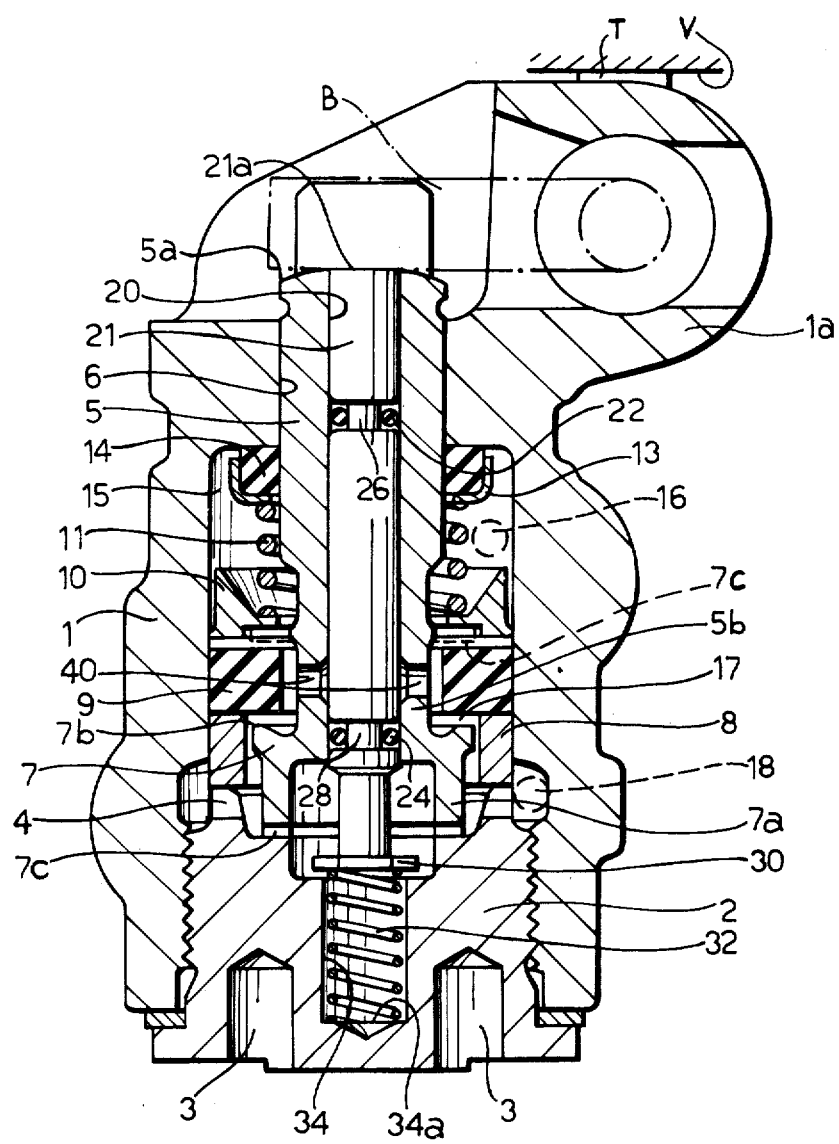
Figure 2:
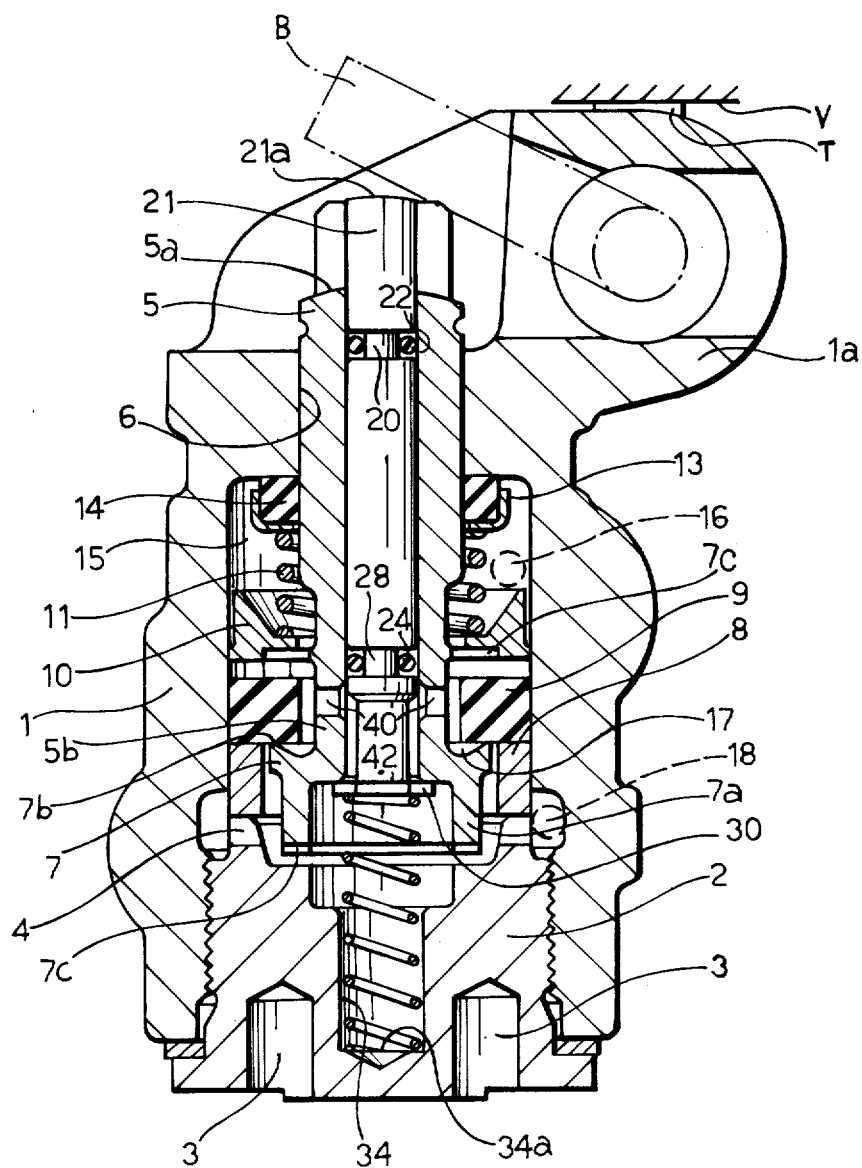
FIGS. 2 and 4 show the valve in longitudinal section and, respectively in the forms of realization as per FIG. 1 and FIG. 3, in a situation corresponding to the elastic means being broken.

With reference to FIGS. 1 and 2, the valve comprises a cylinder 1 closed at one end by means of a tap 2; at one end of this tap there is a pair of intended seats 3 for the use of a tool to facilitate assembly and disassembly, at the other end there is a transverse slot 4.

Inside the cylinder 1 a piston is mounted, the stem 5 of which moves in a bore 6 machined in the bottom wall 1a of the cylinder, opposite the tap 2. The extremity of the piston stem 5 which protrudes outside the cylinder has a curved surface 5a, upon which acts a torsion bar B, connected to the chassis T of the vehicle V; at the opposite extremity the stem 5 has a head 7, the face of which facing the tap 2 presents a circular projection 7a with slits 7c, and on the opposite part a peripheral lip 7b.

The head 7 is encircled with a radial play by spacer ring element 8.

At the side of the spacer ring 8, opposite to that facing the tap 2 is located a gasket ring 9 made of elastomer material, rubber for example. It is mounted with a light radial compression, in the internal chamber of the cylinder 1 and encircles with radial play the part 5b of the stem 5 next to the head 7.

The piston stem 5 is provided, at a distance from the head 7 greater than the axial thickness of the ring 9, with a profiled flange 7e, against which, by means of the ring, rests a spring 11 having the function of keeping the piston head 7 always in contact with the tap 2, even when the reaction bar located externally to the device does not transmit its thrust to the extremity of the stem 5 protruding outside the cylinder.

The spring 11 rests with its extremity opposite the profiled flange 7e, against a metal retainer cap 13 which holds the gasket ring 14 in the operative position and has the function of securing the seal at the passage of the piston stem 5 through the bore 6 machined in the bottom wall 1a of the cylinder.

During the movement of the piston 5, 7 in a direction opposite from the tap 2, movement which takes place in a manner known per se during operation of the device, the lip 7b of the head adheres at a certain point, to the gasket 9. A net subdivision results inside the cylinder 1, creating a high pressure chamber 15 connected to the master cylinder through the opening 16, and a low pressure chamber 17, formed between the tap 2 and the surface facing the latter of the piston head 7 and of the gasket ring 9, communicating with the rear wheel braking circuit, through the opening 18.

The stem 5 presents a cylindrical axial cavity 20 extending its complete length and in which a piston 21 moves sealed by means of "o-rings" 22, 24 retained in grooves 26, 28; piston 21 is longer than piston 5, 7 and presents a rounded end 21a at the end 5a of the stem 5 which also co-operates with the torsion bar B; at the opposite end the piston 21 presents a radial protrusion 30 of a diameter greater than that of the opening 20 and upon which acts a compression spring 32, the other end of the spring abutting on the bottom 34a of a blind axial hole 34 machined in the tap 2. In correspondence with the gasket 9 the stem 5 presents radial holes 40 which put the chamber 15 in communication with the cavity 20; in the part included between the head 7 and the protrusion 30 the piston presents a reduced diameter section 42, the length of which is not less than the distance between the radial holes 40 and the head 7. The operation of the valve group just described, as can be deduced from the FIG. 2, is the following: in case the torsion bar B breaks, the piston 21 will then no longer be constrained by the above mentioned torsion bar in the position of FIG. 1, and as a consequence of the effect of the spring 32, it will undergo an upward movement, as illustrated in FIG. 2. In this case the reduced diameter section 42 of the piston 21 will permit a free communication between the holes 40 and the passage 18, cutting off the valve unit which effects the reduction of pressure, conformably with the specified objectives.

Figure 3:
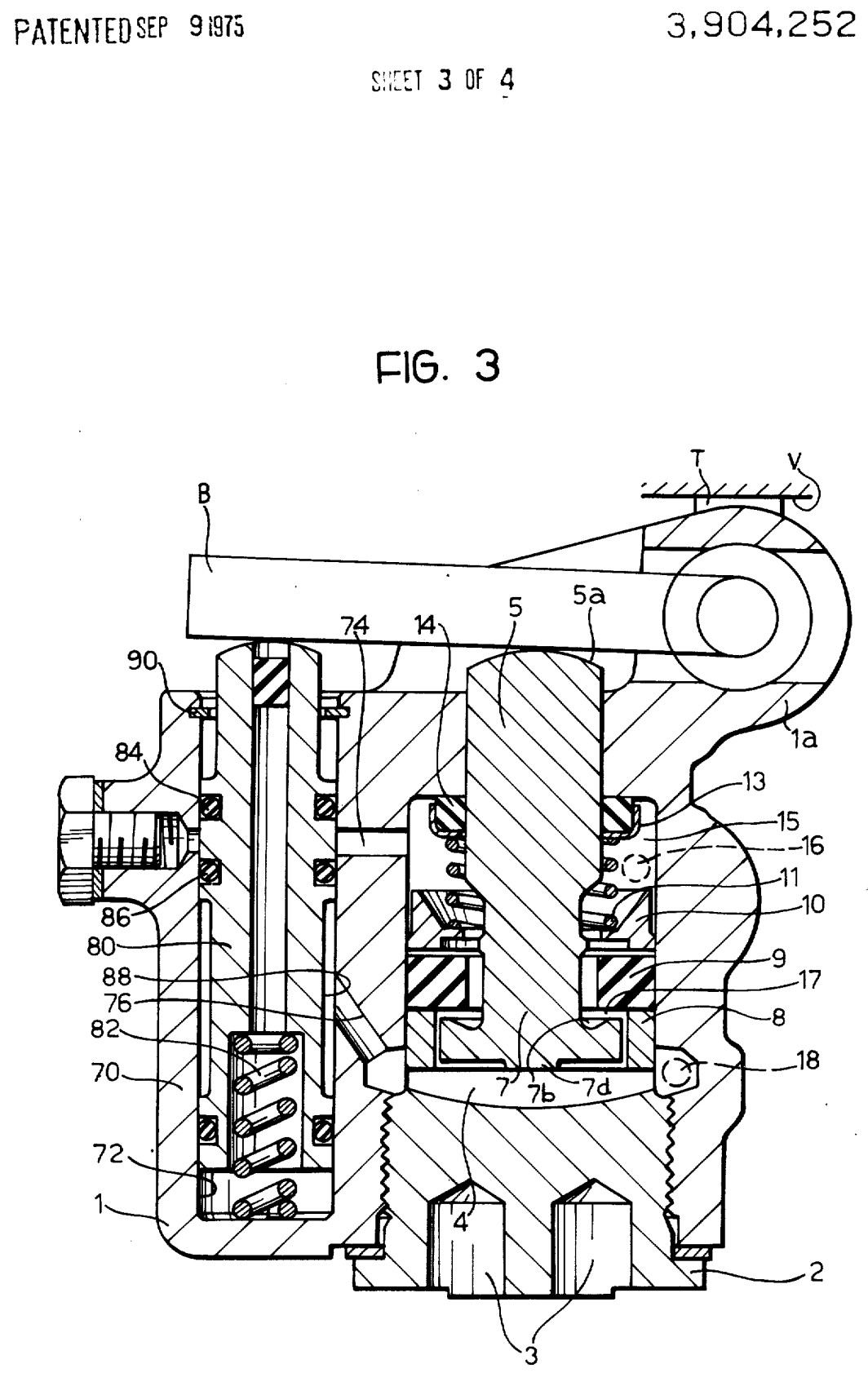
Figure 4:
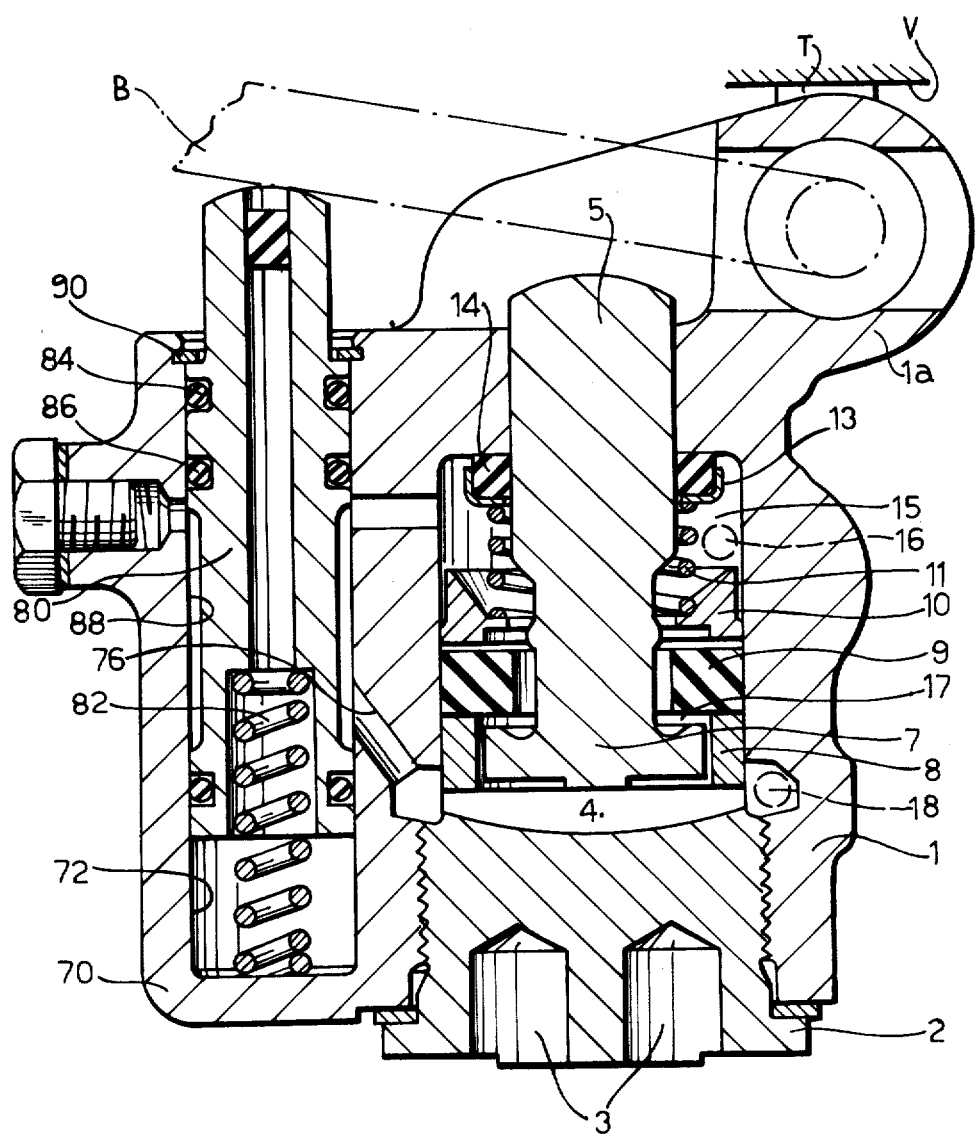

FIGS. 3 and 4 represent a further form of realization in which the valve means which make the direct communication possible between the intake port and the delivery port are arranged outside the body 1; in said case the conformation of the reduction valve in its original part is identical to that described in the above mentioned patent; thus the head 7 of the stem 5 presents a prominence 7d which normally rests on the rabbet of the slot 4. To the body 1 of the pressure reducer a box 70 is applied having an almost cylindrical form and presenting internally a cylindrical cavity 72 having the axis approximately parallel to the axis of the stem 5; the cavity 72 communicates with the intake ad delivery ports through two respective ducts 74, 76; in the cavity can travel, by means of seal rings, a piston 80, whose axial position depends upon the concomitant action of the torsion bar and of a compression spring 82 positioned in the bottom of the cavity 72 at the extremity opposite the bar B; normally, under the concomitant action of the two forces the ducts 74, 76 are kept separated, in fact, by two "o-rings" 84, 86; the piston 80 presents a section 88 which is of reduced diameter and of a length at least equal to the distance between the ducts 74, 76; thus in case the torsion bar breaks the piston 80 will be thrust upwards by the spring 82 against an elastic stop ring 90, the section 88 becomes inserted between the ducts 74, 76 establishing a direct communication between them and thus also between the intake and delivery ports, conformably with the specified objectives, as can be clearly deduced in FIG. 4.

It is understood that the forms of realization just described are given merely by way of non limiting examples, and that numerous other variants and possibilities of realization can be effected without deviating from the scope of the invention.

What I claim is:

1. In a vehicle hydraulic brake system having a brake pressure regulator provided in a hydraulic line between a source of fluid under pressure and wheel brake means and elastic means connected to the chassis of the vehicle for applying a force to said brake pressure regulator to control the hydraulic pressure to the wheel brake means in dependence upon changes of vehicle load, the improvement in said regulator comprising a housing defining a cylinder having an intake port connected to said pressure source and a delivery port connected to the brake means, first piston means slidably disposed in said cylinder in operative engagement with said elastic means, first valve means operable by said first piston means located in said cylinder between said intake port and said delivery port to reduce the hydraulic pressure between said ports, said first piston means having a coaxial cylindrical bore, second piston means slidably disposed in said bore in operative engagement with said elastic means, spring means in said housing biasing said second piston means into engagement with said elastic means and second valve means operable by said second piston means for directly connecting said intake port and said delivery port upon shifting of said second piston means by said spring means upon breakage of said elastic means.

2. In a vehicle hydraulic brake system as set forth in claim 1 further comprising flange means on said second piston means for engaging said first piston means when said second piston means is shifted by said spring means upon breakage of said elastic means to shift said first piston means to close said first valve means.

3. In a vehicle hydraulic brake system as set forth in claim 2 wherein said second valve means is comprised of passage means extending through said first piston means to provide communication between said intake port and said bore and a reduced diameter portion on said piston means for providing communication between said passage means and said delivery port.

* * * * *